(12) United States Patent
Oikawa et al.

(10) Patent No.: US 10,815,664 B2
(45) Date of Patent: Oct. 27, 2020

(54) COATED PC STEEL STRANDED CABLE

(71) Applicant: Sumitomo Electric Industries, Ltd., Osaka-shi (JP)

(72) Inventors: Masashi Oikawa, Itami (JP); Masato Yamada, Itami (JP); Yoshiyuki Matsubara, Itami (JP); Shinji Nakaue, Itami (JP); Toru Yamamoto, Tokyo (JP); Shinichi Yamanobe, Tokyo (JP); Michio Imai, Tokyo (JP); Naoki Sogabe, Tokyo (JP); Kazumasa Okubo, Tokyo (JP); Kazuyoshi Chikiri, Fukuchiyama (JP); Toshiyuki Kobayashi, Fukuchiyama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 169 days.

(21) Appl. No.: 15/542,332

(22) PCT Filed: Jan. 5, 2016

(86) PCT No.: PCT/JP2016/050120
§ 371 (c)(1),
(2) Date: Jul. 7, 2017

(87) PCT Pub. No.: WO2016/111290
PCT Pub. Date: Jul. 14, 2016

(65) Prior Publication Data
US 2018/0274237 A1   Sep. 27, 2018

(30) Foreign Application Priority Data

Jan. 8, 2015 (JP) .................................. 2015-002709

(51) Int. Cl.
*E04C 5/08* (2006.01)
*D07B 1/14* (2006.01)
(Continued)

(52) U.S. Cl.
CPC ............. *E04C 5/08* (2013.01); *D07B 1/145* (2013.01); *D07B 1/148* (2013.01); *D07B 1/162* (2013.01);
(Continued)

(58) Field of Classification Search
CPC ........ D07B 1/145; D07B 1/148; D07B 1/162; D07B 1/0693; D07B 2201/2041;
(Continued)

(56) References Cited

U.S. PATENT DOCUMENTS 4,389,088 A * 6/1983 Trezequet ............ G02B 6/4407
385/105
4,696,542 A * 9/1987 Thompson ........... D07B 1/0693
385/107
(Continued)

FOREIGN PATENT DOCUMENTS

CN       2326968 Y       6/1999
JP    2000-046527 A      2/2000
(Continued)

OTHER PUBLICATIONS

Smarzija-Jovanivic et al., Nanocomposites, Elsevier, Jul. 2011 accessed via https://www.researchgate.net/publication/251670044_Nanocomposites_based_on_silica-reinforced_ethylene-propylene-diene-monomeracrylonitrile-butadiene_rubber_blends, last visited Mar. 11, 2019. (Year: 2011).*
(Continued)

*Primary Examiner* — Shaun R Hurley
*Assistant Examiner* — Patrick J. Lynch
(74) *Attorney, Agent, or Firm* — Baker Botts L.L.P.; Michael A. Sartori

(57) ABSTRACT

A coated PC steel stranded cable includes: a stranded cable in which a plurality of elemental wires each composed of steel are twisted together; an anti-corrosive coating having
(Continued)

an outer circumferential portion that coats an outer circumference of the stranded cable; an outer coating that coats an outer circumference of the anti-corrosive coating; and an optical fiber provided at a position inwardly of an outer circumferential surface of the outer coating and corresponding to a strand groove in the stranded cable so as to follow expansion and contraction of the stranded cable.

13 Claims, 12 Drawing Sheets

(51) Int. Cl.

| | | |
|---|---|---|
| E04G 21/12 | (2006.01) | |
| D07B 1/16 | (2006.01) | |
| D07B 1/06 | (2006.01) | |
| G01L 1/24 | (2006.01) | |
| G01L 5/04 | (2006.01) | |
| E04B 1/16 | (2006.01) | |

(52) U.S. Cl.
CPC ............ *E04G 21/12* (2013.01); *D07B 1/0693* (2013.01); *D07B 2201/2041* (2013.01); *D07B 2201/2044* (2013.01); *D07B 2201/2046* (2013.01); *D07B 2201/2092* (2013.01); *D07B 2201/2096* (2013.01); *D07B 2205/206* (2013.01); *D07B 2205/3025* (2013.01); *D07B 2301/259* (2013.01); *D07B 2401/2025* (2013.01); *D07B 2501/2023* (2013.01); *E04B 1/16* (2013.01); *E04B 2103/02* (2013.01); *E04B 2103/06* (2013.01); *G01L 1/242* (2013.01); *G01L 5/04* (2013.01)

(58) Field of Classification Search
CPC .... D07B 2201/2044; D07B 2201/2046; D07B 2201/2092; D07B 2201/2096; D07B 2205/206; D07B 2205/3025; D07B 2401/2025; D07B 2501/2023; E04G 21/12; E04B 1/16; E04B 2103/02; E04B 2103/06; G01L 1/242; G01L 5/04; E04C 5/08; G02B 6/4415; G02B 6/443; G02B 6/4427; G02B 6/4401; G01M 11/33; G01B 11/16
USPC ........................... 57/234, 223, 212; 356/73.1
See application file for complete search history.

(56) References Cited

U.S. PATENT DOCUMENTS

| | | | | |
|---|---|---|---|---|
| 6,490,931 | B1* | 12/2002 | Fernald | G01L 1/242 73/705 |
| 7,326,854 | B2 | 2/2008 | Varkey | |
| 2003/0206419 | A1* | 11/2003 | Longatti | D04C 1/12 362/551 |
| 2007/0044991 | A1* | 3/2007 | Varkey | H01B 7/046 174/102 R |
| 2007/0102188 | A1* | 5/2007 | Glew | H01B 7/295 174/113 C |
| 2008/0236130 | A1* | 10/2008 | Furukawa | D07B 1/0673 57/212 |
| 2009/0034903 | A1* | 2/2009 | Herbst | G01L 1/242 385/13 |
| 2012/0265102 | A1* | 10/2012 | Leo | A61B 5/6852 600/587 |
| 2013/0034324 | A1* | 2/2013 | Laing | G01K 11/32 385/13 |
| 2013/0094822 | A1* | 4/2013 | Hurley | G02B 6/4429 385/102 |
| 2014/0056553 | A1* | 2/2014 | Villiger | G02B 6/4407 385/12 |
| 2014/0153884 | A1* | 6/2014 | Stoesz | G01L 1/242 385/107 |
| 2019/0049681 | A1* | 2/2019 | Bookbinder | G02B 6/4432 |

FOREIGN PATENT DOCUMENTS

| | | | | |
|---|---|---|---|---|
| JP | 2002-221457 A | | 8/2002 | |
| JP | 2007-297777 A | | 11/2007 | |
| JP | 2010-133871 A | | 6/2010 | |
| JP | 2010-174423 A | | 8/2010 | |
| JP | 2019070593 A | * | 5/2019 | ............ E04C 5/08 |
| JP | 2019070594 A | * | 5/2019 | ............ G02B 6/245 |
| JP | 2019101267 A | * | 6/2019 | ............ G01N 21/88 |
| JP | 2019108747 A | * | 7/2019 | ............ G01B 11/16 |
| WO | WO-2013066315 A1 | * | 5/2013 | ............ G01B 11/16 |

OTHER PUBLICATIONS

Coating, https://www.dictionary.com/browse/coating, last visited Aug. 20, 2019.*
English language translation of JP2000-046527 to Yamashita, obtained via espacenet.com (last visited Mar. 31, 2020).*
Matsuzaki, et al., "The Basic Research on Strain Management of the Concrete Structure Using Optical Fiber," Proceedings of the Japan Concrete Institute, 2001, vol. 23, No. 1, pp. 637-642 [Cited in ISR].

* cited by examiner

COATED PC STEEL STRANDED CABLE

TECHNICAL FIELD

The present invention relates to a coated prestressed concrete (PC) steel stranded cable including an optical fiber. Particularly, the present invention relates to a coated PC steel stranded cable that facilitates transfer of strain of an elemental wire and facilitates protection of an optical fiber.

BACKGROUND ART

A PC steel, such as a PC (prestressed concrete) steel stranded cable, has been known as a member (tension member) for reinforcing a concrete structure by transferring compressive force to the concrete structure when the member is embedded inside the concrete structure or disposed outside the concrete structure.

For example, Patent Document 1 (Japanese Patent Laying-Open No. 2010-133871) discloses a tension member (PC steel stranded cable) including: a hollow body; and a plurality of elemental wires twisted together to surround an outer circumference of the hollow body so as to bear tension force. Inside the hollow body of this tension member (PC steel stranded cable), an optical fiber and a filler material are provided. The optical fiber is used as a strain sensor. The filler material is provided between the hollow body and the optical fiber so as to hold the position of the optical fiber within the hollow body. By storing the optical fiber inside the hollow body, the optical fiber is prevented from being damaged during use of the tension member and strain generated in the tension member is transferred to the optical fiber via the elemental wire, the hollow body, and the filler material.

CITATION LIST

Patent Document

PTD 1: Japanese Patent Laying-Open No. 2010-133871

SUMMARY OF INVENTION

Technical Problem

A demand arises in a configuration that ensures transfer of strain using a thinner structure without using the above-described hollow body and filler material while sufficiently protecting the optical fiber. The hollow body and filler material thus provided serve to protect the optical fiber and allow the optical fiber to follow expansion and contraction of the elemental wire. However, since the hollow body and filler material do not substantially serve as a tension member, the inclusion of the hollow body and filler material leads to an increased number of components and an increased diameter of the tension member.

The present invention has been made in view of the above-described circumstances, and has an object to provide a coated PC steel stranded cable that facilitates transfer of strain of an elemental wire and facilitates protection of an optical fiber.

Solution to Problem

A coated PC steel stranded cable according to one embodiment of the present invention includes: a stranded cable in which a plurality of elemental wires each composed of steel are twisted together; an anti-corrosive coating having an outer circumferential portion that coats an outer circumference of the stranded cable; an outer coating that coats an outer circumference of the anti-corrosive coating; and an optical fiber provided at a position inwardly of an outer circumferential surface of the outer coating and corresponding to a strand groove in the stranded cable so as to follow expansion and contraction of the stranded cable.

Advantageous Effects of Invention

The coated PC steel stranded cable described above facilitates transfer of strain of the elemental wire and facilitates protection of the optical fiber.

DESCRIPTION OF EMBODIMENTS

Figure 1:
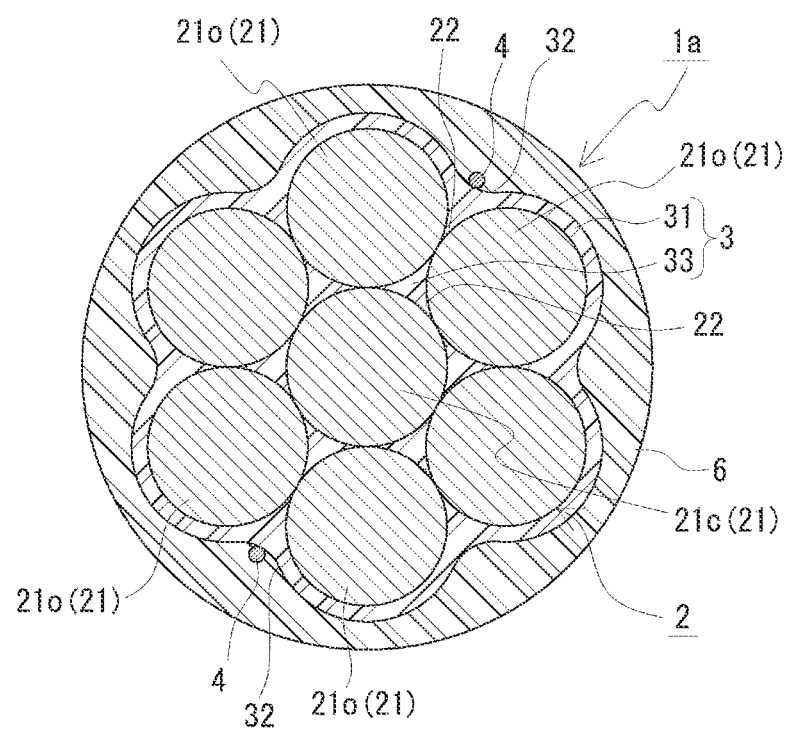
FIG. 1 is a schematic cross sectional view showing a coated PC steel stranded cable according to a first embodiment.

Description of Embodiments of the Present Invention

First, contents of embodiments of the present invention are listed and described.

(1) A coated PC steel stranded cable according to one embodiment of the present invention includes: a stranded cable in which a plurality of elemental wires each composed of steel are twisted together; an anti-corrosive coating having an outer circumferential portion that coats an outer circumference of the stranded cable; an outer coating that coats an outer circumference of the anti-corrosive coating; and an optical fiber provided at a position inwardly of an outer circumferential surface of the outer coating and corresponding to a strand groove in the stranded cable so as to follow expansion and contraction of the stranded cable.

According to the above-described configuration, the anti-corrosive coating included therein facilitates the elemental wires to behave uniformly as compared with a case where no anti-corrosive coating is provided. Accordingly, precision in measuring strain by an optical fiber is facilitated to be increased. Moreover, since the optical fiber is disposed at a position inwardly of the outer circumferential surface of the outer coating and corresponding to the strand groove, the optical fiber is facilitated to follow expansion and contraction of the stranded cable, whereby strain of each elemental wire is facilitated to be transferred and measured with precision.

When the stranded cable is tensioned if there is no anti-corrosive coating, the elemental wires are biased, with the result that excessive compressive force may act on the optical fiber at the position corresponding to the strand groove. This may lead to decreased precision in measuring strain and damage of the optical fiber. To address this, according to the above configuration, since the anti-corrosive coating is included, the elemental wire upon the stranded cable being tensioned can be suppressed from being biased, thereby facilitating suppression of decreased precision in measuring the strain and suppression of mechanical damage of the optical fiber. Moreover, by disposing the optical fiber at the position corresponding to the strand groove, the optical fiber is readily protected from an external environment by the elemental wires disposed at the both sides of the optical fiber and the elemental wires surrounding the optical fiber. Moreover, the optical fiber is facilitated to be disposed in the envelope circle of the coated PC steel stranded cable, whereby the diameter of the coated PC steel stranded cable is unlikely to be large.

When the optical fiber is disposed between the anti-corrosive coating and the outer coating (boundary portion), the outer coating included therein further facilitates the optical fiber to follow expansion and contraction of the stranded cable. Moreover, corrosion of the stranded cable is facilitated to be suppressed.

According to the above configuration, no conventional hollow body or filler material is included, whereby the number of components can be reduced.

(2) As one embodiment of the coated PC steel stranded cable, the optical fiber is fixed by an adhesive agent to the strand groove in a surface of the anti-corrosive coating.

According to the above configuration, the optical fiber is fixed to the strand groove of the anti-corrosive coating using an adhesive agent, whereby the optical fiber is facilitated to follow expansion and contraction of the stranded cable.

(3) As one embodiment of the coated PC steel stranded cable, the optical fiber is fixed by the anti-corrosive coating without using an adhesive agent.

According to the above configuration, the optical fiber can be fixed by the anti-corrosive coating itself, whereby the adhesive agent can be unnecessary. This eliminates complicatedness related with an operation of applying the adhesive agent. Moreover, as compared with a case where the optical fiber is fixed using the adhesive agent, the optical fiber can be expected to follow expansion and contraction of the stranded cable for a long period of time.

(4) As one embodiment of the coated PC steel stranded cable in which the optical fiber is fixed by the anti-corrosive coating without using an adhesive agent, the optical fiber has a portion embedded in and incorporated with the anti-corrosive coating.

According to the above configuration, the optical fiber has a portion embedded in and incorporated with the anti-corrosive coating, whereby the optical fiber is facilitated to follow expansion and contraction of the stranded cable. Moreover, the optical fiber can be unlikely to be separated from the anti-corrosive coating, thus facilitating prevention of detachment of the optical fiber.

(5) As one embodiment of the coated PC steel stranded cable in which the optical fiber is fixed by the anti-corrosive coating without using an adhesive agent, the anti-corrosive coating has a surface provided with a press-fit groove in which a portion of the optical fiber is press-fitted.

According to the above-described configuration, the surface of the anti-corrosive coating is provided with the press-fit groove in which a portion of the optical fiber is press-fitted, whereby the optical fiber is facilitated to follow expansion and contraction of the stranded cable.

(6) As one embodiment of the coated PC steel stranded cable, the anti-corrosive coating has a surface provided with an irregularity for increasing frictional resistance with the optical fiber and the outer coating. In this case, the irregularity is smaller than an irregularity formed by the strand groove.

According to the above-described configuration, frictional resistance between the optical fiber and the anti-corrosive coating and frictional resistance between the anti-corrosive coating and the outer coating are facilitated to be increased, whereby the optical fiber is facilitated to follow expansion and contraction of the stranded cable.

(7) As one embodiment of the coated PC steel stranded cable, the optical fiber is disposed at a triple point surrounded by an outer circumferential elemental wire and an inner circumferential elemental wire or central elemental wire, the outer circumferential elemental wire and the inner circumferential elemental wire or the central elemental wire constituting the stranded cable, the inner circumferential elemental wire or the central elemental wire being adjacent to the outer circumferential elemental wire.

According to the above-described configuration, since the optical fiber is surrounded by the elemental wires, the optical fiber can be protected mechanically. Moreover, the optical fiber is disposed in the space at the triple point, whereby the diameter of the coated PC steel stranded cable is unlikely to be large.

(8) As one embodiment of the coated PC steel stranded cable, when the optical fiber is disposed at the triple point, the anti-corrosive coating has a filler portion provided between the elemental wires.

According to the above-described configuration, since the optical fiber can be incorporated with the elemental wire at the triple point by the filler portion, the optical fiber is facilitated to follow expansion and contraction of the stranded cable.

(9) As one embodiment of the coated PC steel stranded cable, when the optical fiber is disposed at the triple point, the stranded cable includes the central elemental wire, and a plurality of outer circumferential elemental wires helically twisted around an outer circumference of the central elemental wire, and a space between adjacent outer circumferential elemental wires has a length equal to or more than a diameter of the optical fiber.

According to the above-described configuration, the optical fiber is facilitated to be disposed at the triple point. This is because a space equal to or larger than the diameter of the optical fiber is formed if an interval is widened at one position between the outer circumferential elemental wires and the other intervals therebetween are closed when disposing the optical fiber at the triple point. This length of the space refers to, when a space is formed by widening an interval at one position between the outer circumferential elemental wires and the other intervals therebetween are closed, a length between straight lines circumscribed to each of these outer circumferential elemental wires among straight lines orthogonal to the common circumscribed line of two outer circumferential elemental wires that form the space.

DETAILS OF EMBODIMENTS OF THE PRESENT INVENTION

The following describes details of embodiments of the present invention with reference to figures. It should be noted that the present invention is defined by the terms of the claims, rather than these examples, and is intended to include any modifications within the scope and meaning equivalent to the terms of the claims.

First Embodiment

Figure 2:
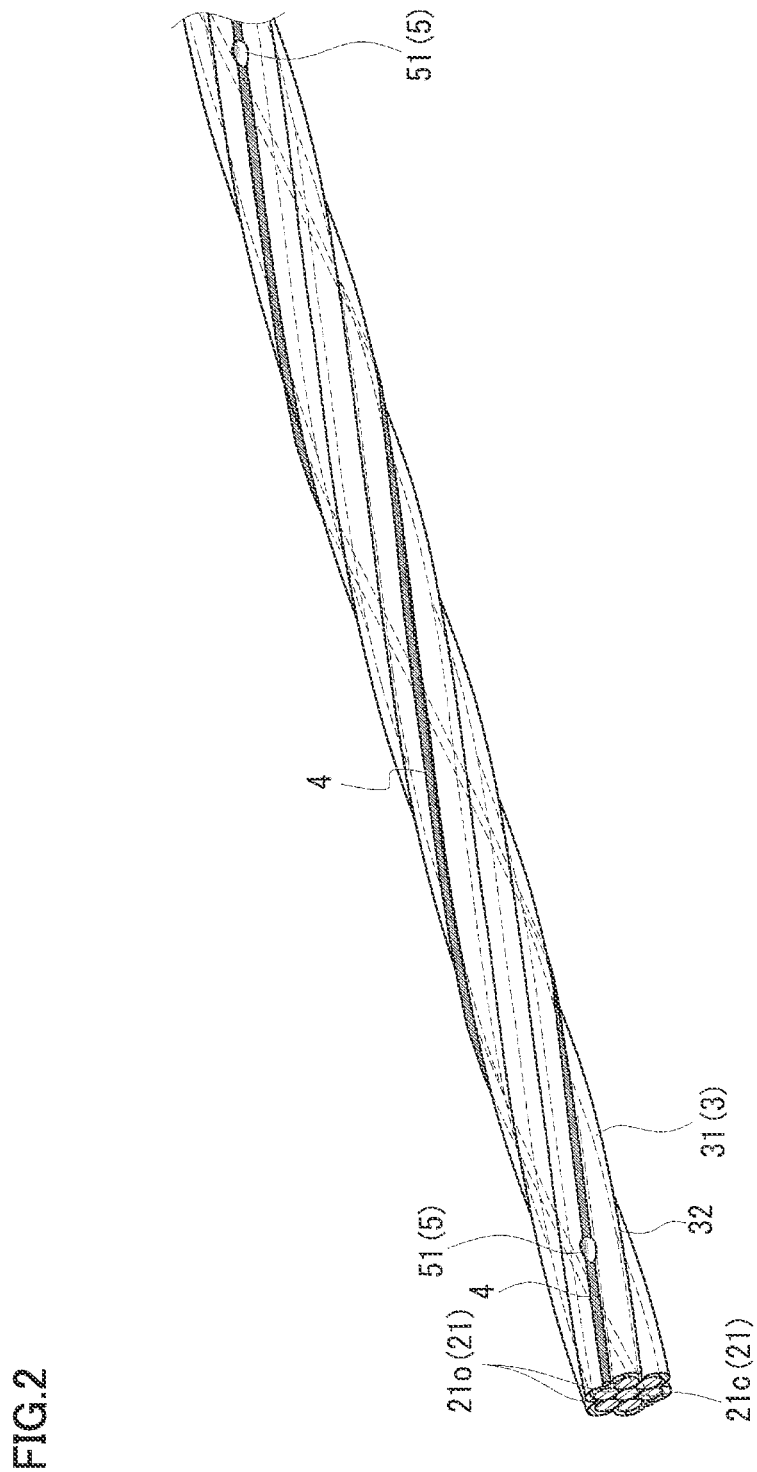
FIG. 2 is a schematic side view showing the coated PC steel stranded cable according to the first embodiment.

With reference to FIG. 1 and FIG. 2, a coated PC steel stranded cable 1a according to a first embodiment will be described. Coated PC steel stranded cable 1a includes: a stranded cable 2 having a plurality of steel elemental wires 21 twisted together; an anti-corrosive coating 3 having an outer circumferential portion 31 that coats the outer circumference of stranded cable 2; an outer coating 6 that coats the outer circumference of anti-corrosive coating 3; and an optical fiber 4. A main feature of this coated PC steel stranded cable 1a lies in that optical fiber 4 is combined with stranded cable 2 by disposing optical fiber 4 at a position (inclusive of a strand groove) inwardly of the outer circumferential surface of outer coating 6 and corresponding to the strand groove in stranded cable 2. Although described later in detail, by combining optical fiber 4 with stranded cable 2, optical fiber 4 is facilitated to follow expansion and contraction of stranded cable 2 (elemental wire 21), whereby strain of elemental wire 21 can be measured with precision. Hereinafter, each configuration will be described in detail. The same reference characters in the figures represent the same components.

[Coated PC Steel Stranded Cable]

Coated PC steel stranded cable 1a is embedded inside a concrete structure or is disposed outside the concrete structure so as to reinforce the concrete structure, for example. Specifically, the concrete structure is reinforced by applying tension force to stranded cable 2 (elemental wire 21) and transferring the tension force to the concrete structure as compressive force.

(Stranded Cable)

Stranded cable 2 is formed by twisting the plurality of steel elemental wires 21 together. Each elemental wire 21 bears tension force. The number of elemental wires 21 can be selected appropriately depending on a manner of use of coated PC steel stranded cable 1a (as an inner cable or an outer cable). Examples of the number of elemental wires 21 include 7, 19, and the like.

Figure 11:
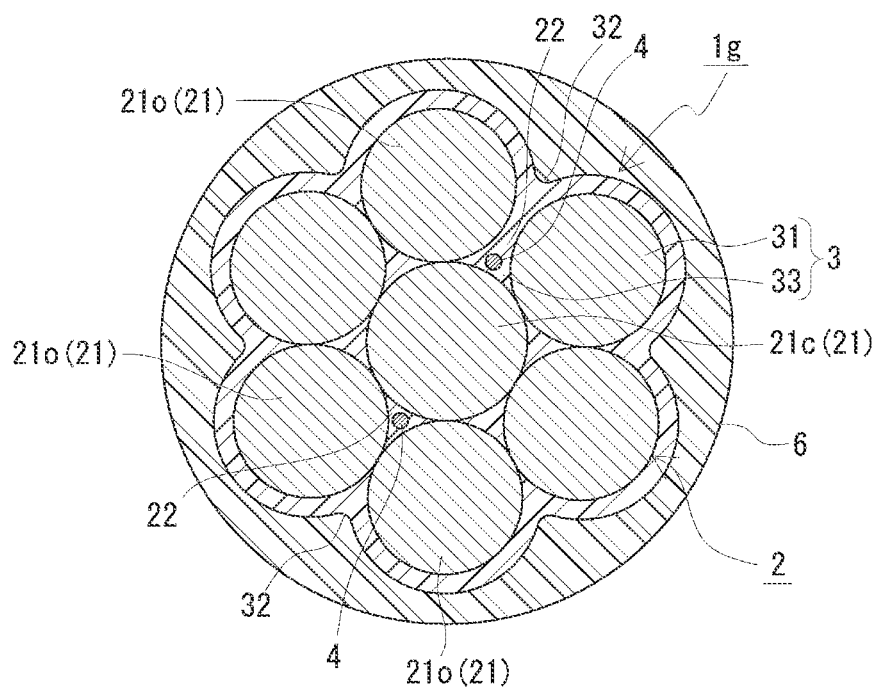
FIG. 11 is a schematic cross sectional view showing a coated PC steel stranded cable according to a modification 2-1.

When the number of elemental wires 21 is 7, stranded cable 2 has a one-layer stranded structure in which six outer circumferential elemental wires 21o are twisted helically around the outer circumference of one central elemental wire 21c. Outer circumferential elemental wires 21o are located at the outermost circumference of stranded cable 2. Central elemental wire 21c and outer circumferential elemental wire 21o may be constituted of elemental wires having substantially the same diameter (FIG. 1). Alternatively, central elemental wire 21c may be constituted of an elemental wire having a diameter larger than the diameter of outer circumferential elemental wire 21o, and outer circumferential elemental wire 21o may be constituted of an elemental wire having a diameter smaller than the diameter. (central elemental wire 21c) (FIG. 11; see a modification 2-1 below).

On the other hand, when the number of the elemental wires is 19, the stranded cable has a two-layer stranded structure (not shown) in which inner circumferential elemental wires and outer circumferential elemental wires are helically twisted around one central elemental wire sequentially from the inner side. Representatively, there are two types of stranded cables having different numbers of inner circumferential elemental wires and outer circumferential elemental wires. Specifically, there are the following two types of stranded cables: a stranded cable including one central elemental wire, nine inner circumferential elemental wires, and nine outer circumferential elemental wires; and a stranded cable including one central elemental wire, six inner circumferential elemental wires, and twelve outer circumferential elemental wires. In the former type, the central elemental wire and each outer circumferential elemental wire are constituted of elemental wires having substantially the same diameter, and each inner circumferential elemental wire is constituted of an elemental wire having a diameter smaller than that of the central elemental wire. In the latter type, the central elemental wire and each inner circumferential elemental wire are constituted of elemental wires having substantially the same diameter. The outer circumferential elemental wires are disposed such that elemental wires having the substantially the same diameter as that of the central elemental wire and elemental wires having a smaller diameter are disposed alternately.

A valley formed at a triple point surrounded by three adjacent elemental wires of stranded cable 2 or a valley formed between two adjacent elemental wires of outer circumferential elemental wire 21c is a strand groove 22 continuous in the longitudinal direction of stranded cable 2. When stranded cable 2 has one-layer stranded structure (with 7 elemental wires), the space at the triple point is formed between central elemental wire 21c and each of two outer circumferential elemental wires 21o. When the stranded cable has a two-layer stranded structure (with 19 elemental wires), the space at the triple point is formed between the central elemental wire and each of two inner circumferential elemental wires, between one inner circumferential elemental wire and each of two outer circumferential elemental wires, and between each of two inner circumferential elemental wires and one outer circumferential elemental wire.

Here, stranded cable 2 has a one-layer stranded structure having 7 elemental wires 21 with central elemental wire 21c and each outer circumferential elemental wire 21o having substantially the same diameter. For stranded cable 2, elemental wires each composed of a known material and having a known size can be used.

(Anti-Corrosive Coating)

Anti-corrosive coating 3 suppresses corrosion of stranded cable 2 by protecting stranded cable 2 from an external environment. Anti-corrosive coating 3 has an outer circumferential portion 31 that coats the outer circumference of stranded cable 2. Outer circumferential portion 31 has a surface along the outer circumferential outline of stranded cable 2, and in the surface, a strand groove 32 is formed at a position corresponding to strand groove 22 of stranded cable 2.

Anti-corrosive coating 3 preferably has a filler portion 33 provided between elemental wires 21 (triple point). Accordingly, moisture or the like can be suppressed from entering the space in stranded cable 2, thus further facilitating suppression of the corrosion of stranded cable 2. Moreover, when optical fiber 4 is disposed at the triple point as in a second embodiment described later (FIG. 10), filler portion 33 thus included can fix optical fiber 4 and elemental wire 21 at the triple point, whereby optical fiber 4 is facilitated to follow expansion and contraction of elemental wire 21. When filler portion 33 is included, outer circumferential portion 31 and filler portion 33 may be continuously formed using the same material. Here, there is provided filler portion 33 continuously formed using the same material as that of outer circumferential portion 31.

Examples of the material of anti-corrosive coating 3 include a resin excellent in corrosion resistance. Examples of such a resin include an epoxy resin, a polyethylene resin, and the like. Here, anti-corrosive coating 3 (outer circumferential portion 31 and filler portion 33) is composed of an epoxy resin.

(Optical Fiber)

Optical fiber 4 is used as a sensor for measuring strain of elemental wire 21. For optical fiber 4, a fiber including a core and a clad can be used suitably. Examples of the materials of the core and the clad include a plastic and quartz glass. For the configuration of optical fiber 4, it is possible to use: an optical fiber elemental wire (not shown) having a primary coating at the outer circumference of the clad; an optical fiber core wire (not shown) further including a secondary coating; an optical fiber cord (not shown) including a reinforcing material at the outer circumference of the secondary coating and an outer sheath that covers the outer circumference of the reinforcing material; and the like. Examples of the material of the primary coating include an ultraviolet curing type resin. Examples of the material of the secondary coating include a flame-retardant polyester elastomer and the like. Examples of the material of the reinforcing material include glass fiber, carbon fiber, aramid fiber, and the like. Examples of the material of the outer sheath include: a flame-retardant polyolefin, such as flame-retardant polyethylene; a flame-retardant cross-linked polyolefin, such as a flame-retardant cross-linked polyethylene; a heat-resistant vinyl; and the like. Here, optical fiber 4 is an optical fiber core wire including a primary coating and a secondary coating with each of the core and the clad being composed of quartz glass.

One or a plurality of optical fibers 4 may be provided. The number of optical fibers 4 can be selected appropriately depending on a method for measuring strain. Examples of the method for measuring strain include: BOCDA (Brillouin Optical Correlation Domain Analysis); BOTDR (Brillouin Optical Time Domain Reflectometry); FBG (Fiber Bragg Grating); and the like. When BOCDA is employed as the measurement method, an even number of optical fibers 4 not less than two are employed. When BOTDR or FBG is employed as the measurement method, one or more optical fibers 4 are employed. When BOCDA is employed as the measurement method, end portions of two optical fibers 4 are drawn from one end side of coated PC steel stranded cable 1a so as to connect the end portions to each other, and the other end portions of the two optical fibers are drawn from the other end side of coated PC steel stranded cable 1a so as to connect to a BOCDA measurement device (not shown). When BOTDR or FBG is employed as the measurement method, one end portion of one optical fiber 4 is disposed at the one end side of coated PC steel stranded cable 1a, and the other end portion of optical fiber 4 is drawn from the other end side of coated PC steel stranded cable 1a so as to connect to a BOTDR measurement device (not shown) or an FBG measurement device (not shown). In each of the measurement methods, when there are provided optical fibers 4 more than necessary for the measurement of strain, an optical fiber 4 not used for the measurement of strain can be used as a spare.

Optical fiber 4 is disposed at a position inwardly of the outer circumferential surface of outer coating 6 and corresponding to the strand groove of stranded cable 2. The expression "optical fiber 4 is disposed inwardly of the outer circumferential surface of outer coating 6" encompasses: a case where optical fiber 4 is embedded in anti-corrosive coating 3; a case where optical fiber 4 is disposed between anti-corrosive coating 3 and outer coating 6 (boundary portion); and a case where optical fiber 4 is embedded in outer coating 6. When optical fiber 4 is embedded in outer coating 6, optical fiber 4 is representatively disposed at a position near the outer circumference of anti-corrosive coating 3. Examples of the position corresponding to the strand groove include: strand groove 32 at the outer side of anti-corrosive coating 3 (surface of outer circumferential portion 31); and strand groove 22 at the inner side of anti-corrosive coating 3. When a plurality of optical fibers 4 (for examples, two) are included, strand grooves 22 and 32 are provided such that optical fibers 4 face each other with central elemental wire 21c being interposed therebetween.

Depending on the position of this optical fiber 4, the coated PC steel stranded cable is configured as: an outer positioning type in which optical fiber 4 is provided in strand groove 32 at the outer side (surface of outer circumferential portion 31) of anti-corrosive coating 3; and an inner positioning type in which optical fiber 4 is provided in strand groove 22 at the inner side of anti-corrosive coating 3. For the outer positioning type, there are the following types: a fixing type in which optical fiber 4 follows expansion and contraction of stranded cable 2 by fixing optical fiber 4 to the surface of outer circumferential portion 31; and a non-fixing type in which optical fiber 4 follows expansion and contraction of stranded cable 2 by frictional resistance between optical fiber 4 and anti-corrosive coating 3 without fixation. For the fixing type, there are the following types: at least one of below-described configurations (1) and (2) in which a fixation member 5 is additionally provided independent of anti-corrosive coating 3; and a below-described configuration (3) or (4) in which no such an independent fixation member 5 is included and anti-corrosive coating 3 itself serves to perform the function of fixation member 5. An example of the non-fixing type is to provide an irregularity 7 at the surface of anti-corrosive coating 3 to increase frictional resistance with optical fiber 4. This irregularity 7 is smaller than the irregularity formed by each of strand grooves 22, 32. Examples of the non-fixing type include: a below-described configuration (5) in which irregularity 7 is formed at the surface of anti-corrosive coating 3 by a different member independent of anti-corrosive coating 3; and a below-described configuration (6) in which no such a different member is included and irregularity 7 is formed at anti-corrosive coating 3 itself. On the other hand, examples of the inner positioning type include below-described configurations (7) and (8).

(1) A configuration in which fixation member 5 is composed of an adhesive agent 51 (FIG. 2).

(2) A configuration in which fixation member 5 is constituted of outer coating 6 that coats the outer circumference of anti-corrosive coating 3 (FIG. 1).

Figure 3:
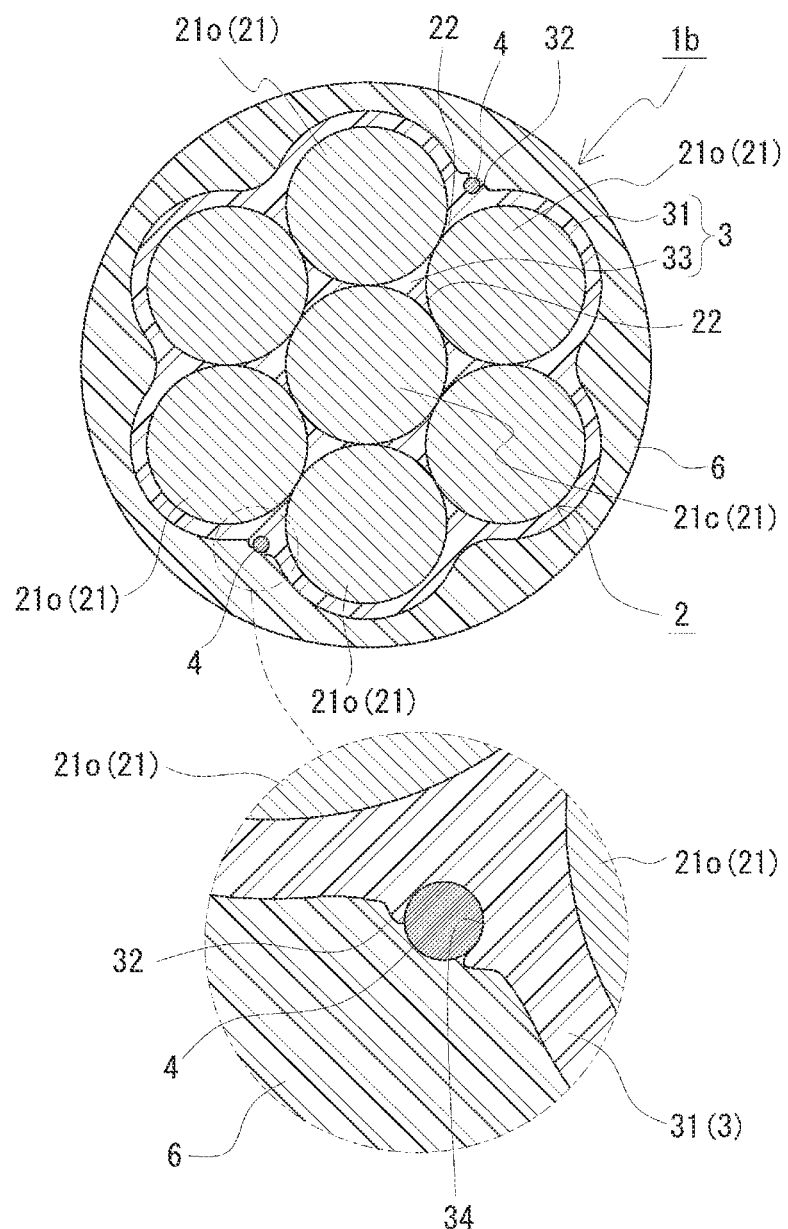
FIG. 3 is a schematic cross sectional view showing a coated PC steel stranded cable according to a modification 1-1.

(3) A configuration in which optical fiber 4 has a portion embedded in the surface of outer circumferential portion 31 of anti-corrosive coating 3 (FIG. 3).

Figure 4:
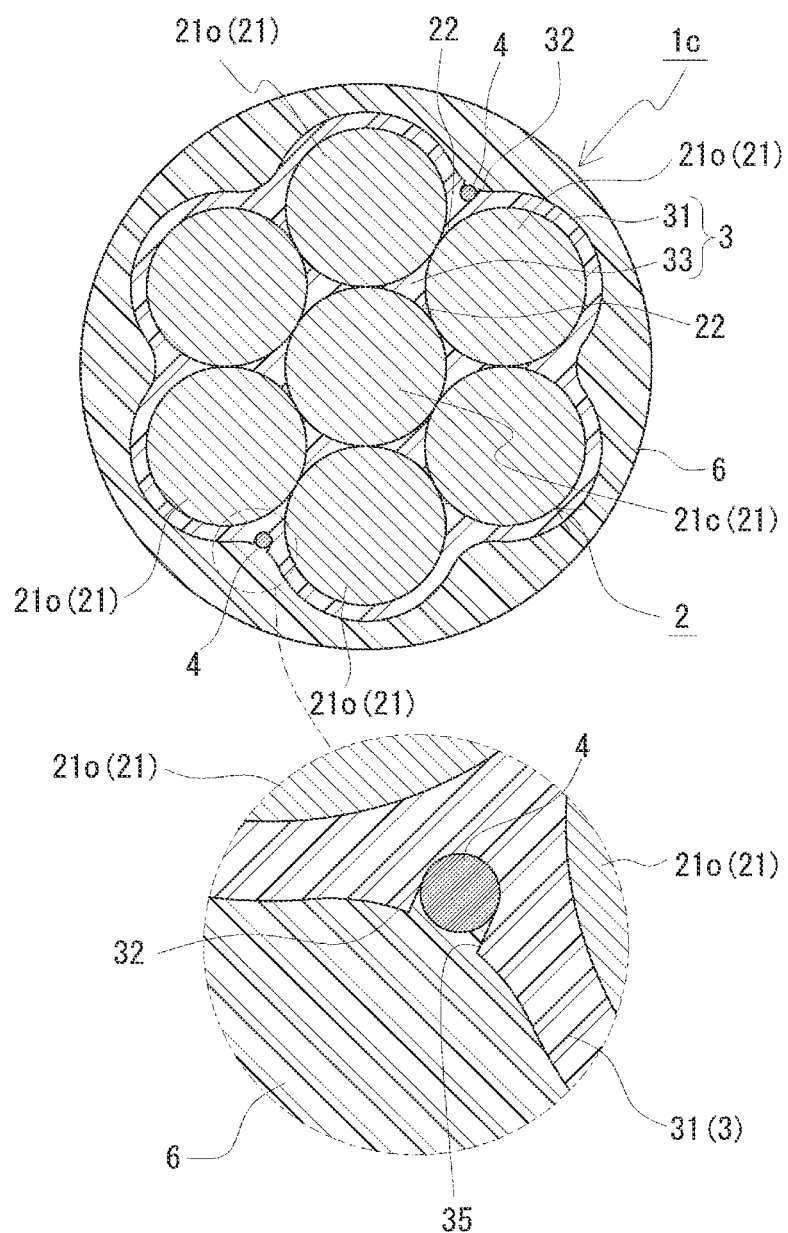
FIG. 4 is a schematic cross sectional view showing a coated PC steel stranded cable according to a modification 1-2.
Figure 5:
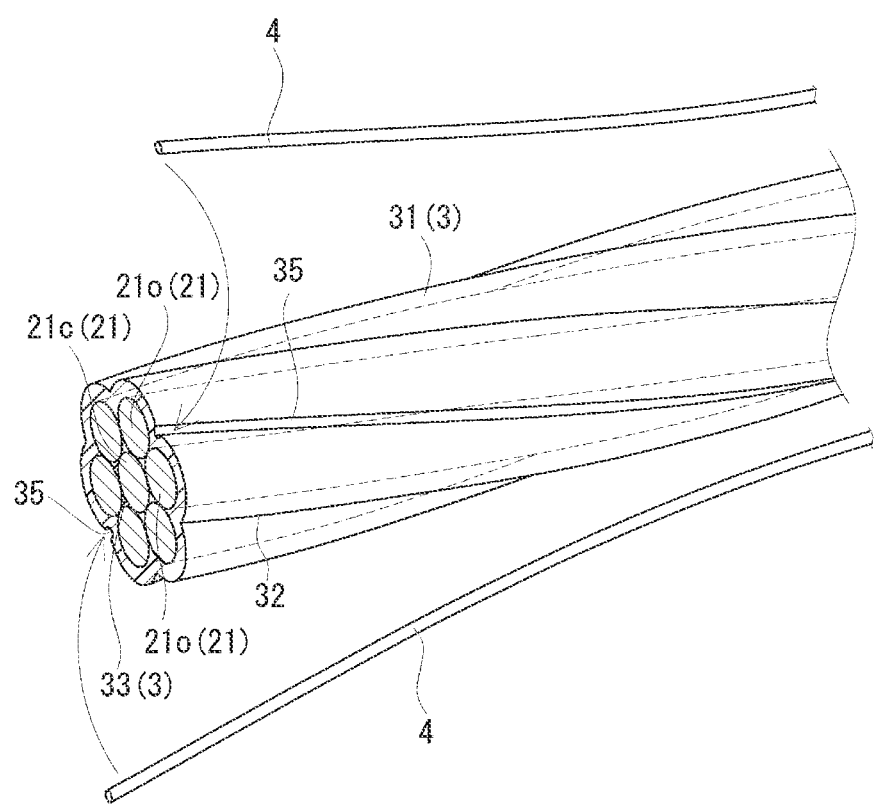
FIG. 5 is a schematic side view showing the coated PC steel stranded cable according to modification 1-2.

(4) A configuration in which a press-fit groove 34 into which optical fiber 4 is press-fitted is formed in the surface of outer circumferential portion 31 of anti-corrosive coating 3 (FIGS. 4 and 5).

Figure 6:
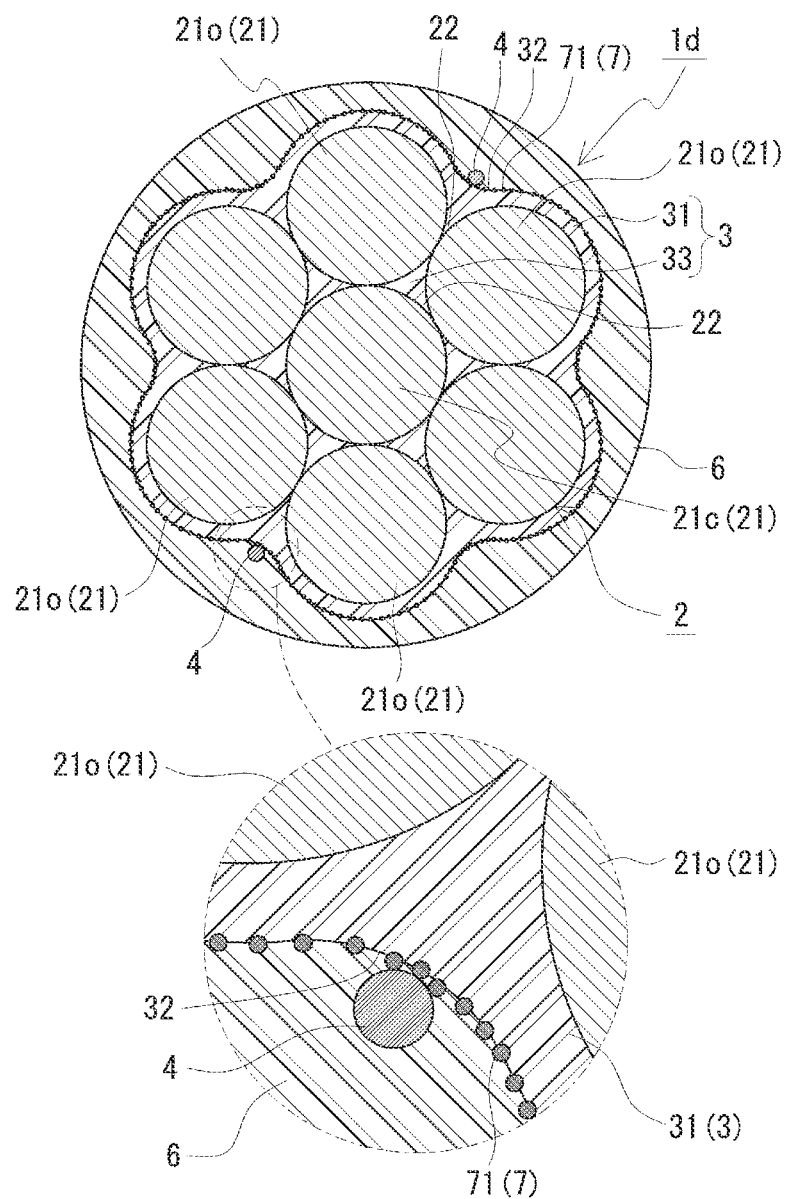
FIG. 6 is a schematic cross sectional view showing a coated PC steel stranded cable according to a modification 1-3.
Figure 7:
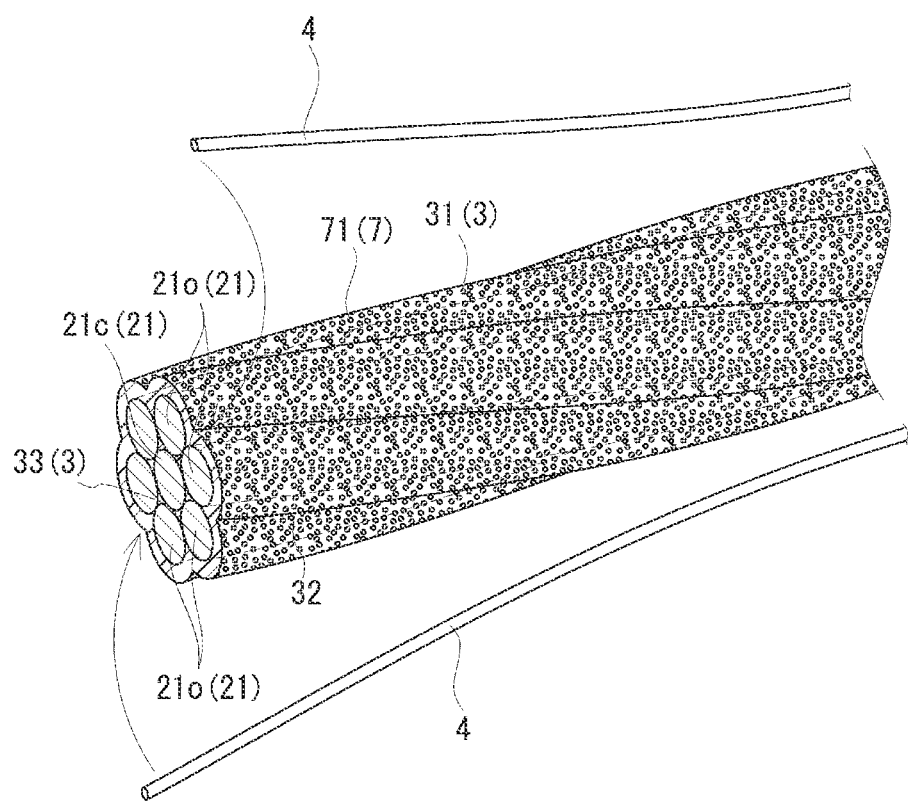
FIG. 7 is a schematic side view showing the coated PC steel stranded cable according to modification 1-3.

(5) A configuration in which irregularity 7 is formed by solid particles 71 partially exposed through the surface of outer circumferential portion 31 of anti-corrosive coating 3 (FIGS. 6 and 7).

Figure 8:
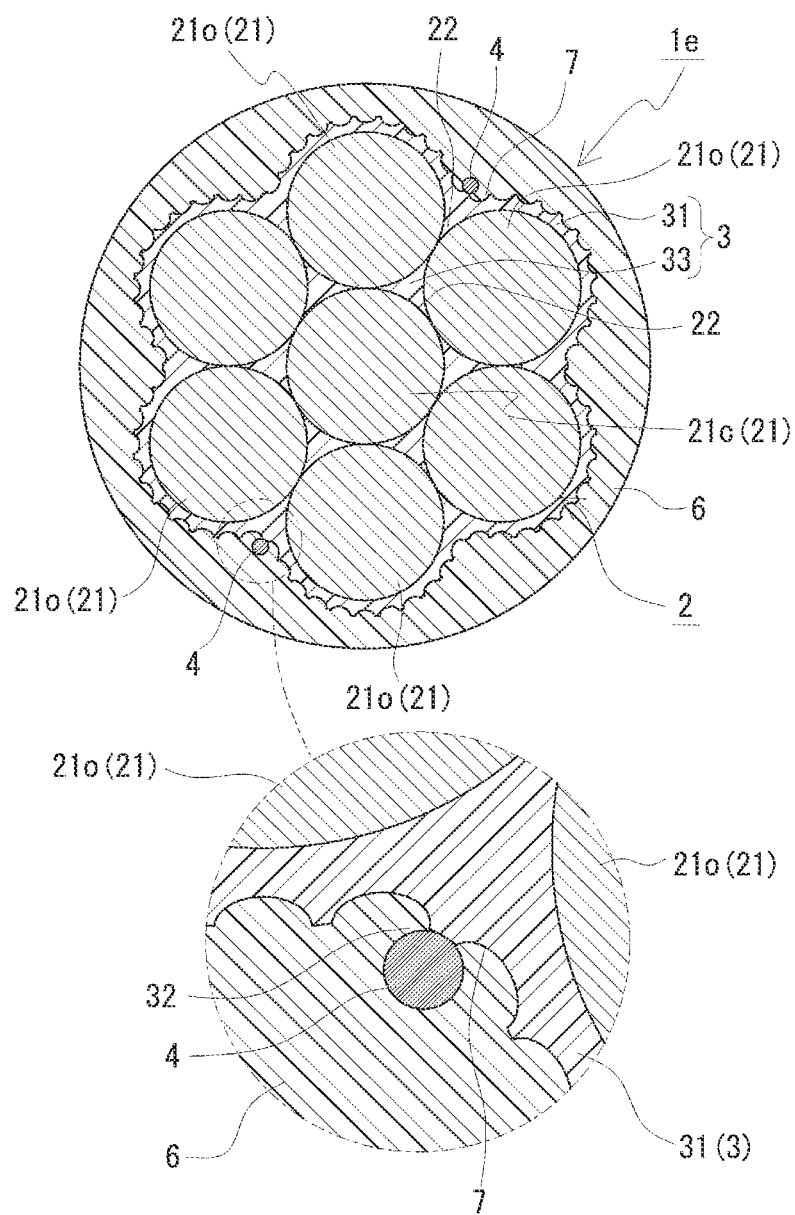
FIG. 8 is a schematic cross sectional view showing a coated PC steel stranded cable according to a modification 1-4.
Figure 9:
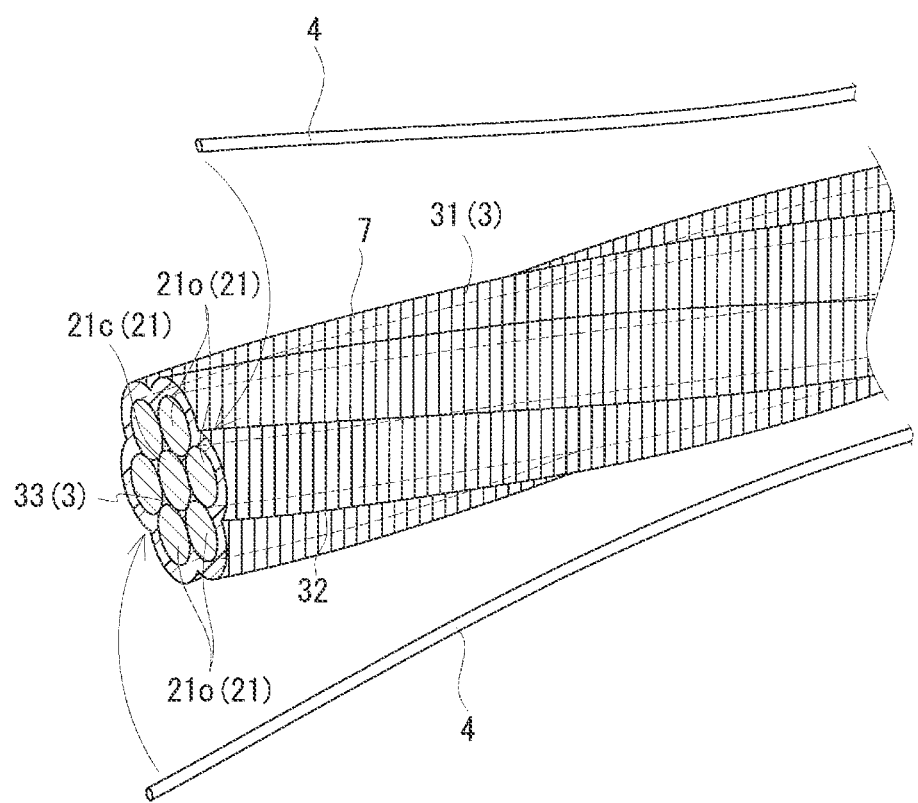
FIG. 9 is a schematic side view showing the coated PC steel stranded cable according to modification 1-4.

(6) A configuration in which irregularity 7 is continuously formed at the surface of anti-corrosive coating 3 through surface treatment to be composed of the material of anti-corrosive coating 3 (FIGS. 8 and 9).

Figure 10:
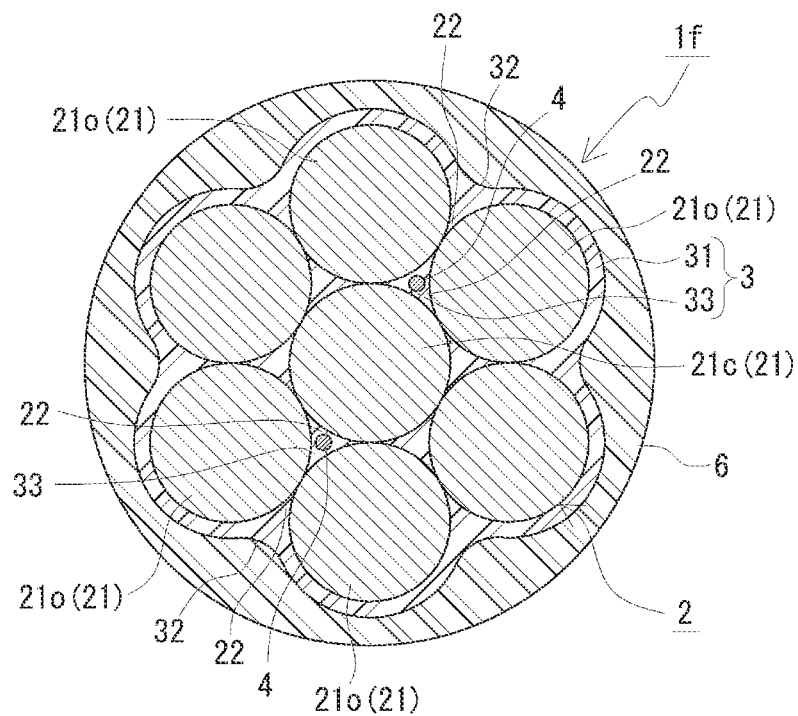
FIG. 10 is a schematic cross sectional view showing a coated PC steel stranded cable according to a second embodiment.

(7) A configuration in which optical fiber 4 is disposed at the triple point (strand groove 22) surrounded by three adjacent elemental wires 21 of stranded cable 2 (FIGS. 10 and 11).

Figure 12:
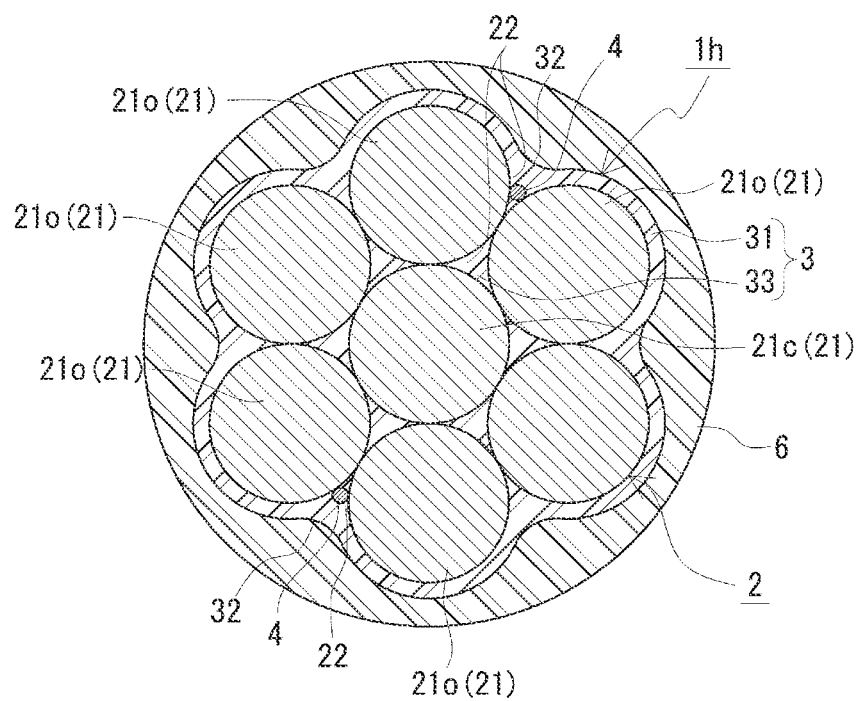
FIG. 12 is a schematic cross sectional view showing a coated PC steel stranded cable according to a modification 2-2.

(8) A configuration in which optical fiber 4 is disposed at the valley (strand groove 22) formed between adjacent outer circumferential elemental wires 21o of stranded cable 2 (FIG. 12).

Here, the configurations (1) and (2) will be described. The configuration (3) will be described in a modification 1-1. The configuration (4) will be described in a modification 1-2. The configuration (5) will be described in a modification 1-3. The configuration (6) will be described in a modification 1-4. The configuration (7) will be described in a second embodiment and a modification 2-1. The configuration (8) will be described in a modification 2-2.

In the first embodiment, optical fiber 4 is disposed at a position corresponding to strand groove 32 of the surface of outer circumferential portion 31. Namely, optical fiber 4 is disposed at a position substantially corresponding to a boundary portion between anti-corrosive coating 3 (outer circumferential portion 31) and outer coating 6 (described below). Optical fiber 4 is disposed in a helical manner along strand groove 32. When two optical fibers 4 are included, these optical fibers 4 are provided in strand grooves 32 such that optical fibers 4 face each other with central elemental wire 21c interposed therebetween (FIG. 1).

(Fixation Member)

Fixation member 5 fixes optical fiber 4 to anti-corrosive coating 3 (FIG. 2). In FIG. 2, for ease of description, outer coating 6 (described below) shown in FIG. 1 is omitted. With this fixation, optical fiber 4 is facilitated to follow expansion and contraction of stranded cable 2, whereby a strain of elemental wire 21 can be readily measured with precision. Fixation member 5 includes an adhesive agent 51. Adhesive agent 51 is applied onto positions at an equal interval along the longitudinal direction of optical fiber 4. For example, adhesive agent 51 is applied per pitch of optical fiber 4. Accordingly, optical fiber 4 can be fixed to the surface of outer circumferential portion 31 to such an extent that optical fiber 4 can follow expansion and contraction of stranded cable 2 while preventing application of adhesive agent 51 from being complicated.

(Outer Coating)

Coated PC steel stranded cable 1a includes outer coating 6 that coats the outer circumference of anti-corrosive coating 3. This further facilitates suppression of corrosion of stranded cable 2. This outer coating 6 can be expected to have a function as fixation member 5 for fixing optical fiber 4 to anti-corrosive coating 3. When outer coating 6 is sufficiently expected to have the function as fixation member 5, adhesive agent 51 described above may be omitted. The outer circumferential surface of outer coating 6 is constituted of a cylindrical surface provided with no strand groove. Examples of the material of outer coating 6 include a PE resin.

[Method for Manufacturing Coated PC Steel Stranded Cable]

Coated PC steel stranded cable 1a described above can be manufactured by a method for manufacturing a coated PC steel stranded cable, the method including a preparing step, a fixing step, and an extruding step below.

(Preparing Step)

In the preparing step, a coated wire including stranded cable 2 and anti-corrosive coating 3, and an optical fiber 4 are prepared. The coated wire may be prepared by: preparing a produced coated wire; or forming a coated wire by forming anti-corrosive coating 3 onto stranded cable 2. Stranded cable 2 can be formed by helically twisting six outer circumferential elemental wires 21o around the outer circumference of central elemental wire 21c.

Anti-corrosive coating 3 is formed through a known powder coating. For the powder coating, outer circumferential elemental wires 21o of stranded cable 2 are untwisted using a batten plate. A space is formed between untwisted outer circumferential elemental wires 21o, thereby sufficiently supplying a resin to between each outer circumferential elemental wire 21o and central elemental wire 21c. Accordingly, the resin (epoxy resin) of anti-corrosive coating 3 can be applied onto the outer circumferences of central elemental wire 21c and outer circumferential elemental wire 21o. These outer circumferential elemental wires 21o are re-twisted around central elemental wire 21c and then the applied resin is cooled. The untwisting and re-twisting allow for formation of filler portion 33 without forming a space at a triple point between central elemental wire 21c and each of two outer circumferential elemental wires 21o, and allows for formation of anti-corrosive coating 3 by forming outer circumferential portion 31 along the helical outer circumferential outline of outer circumferential elemental wire 21o at the outer circumference of outer circumferential elemental wire 21o.

(Fixing Step)

In the fixing step, optical fiber 4 is disposed in strand groove 32 of anti-corrosive coating 3 and is fixed by applying adhesive agent 51. Here, adhesive agent 51 is applied per pitch of optical fiber 4 (FIG. 2).

(Extruding Step)

In the extruding step, a PE resin serving as the resin of outer coating 6 on the outer circumference of anti-corrosive coating 3 is extrusion-molded into outer coating 6. Accordingly, optical fiber 4 is fixed between anti-corrosive coating 3 and outer coating 6.

[Function and Effect]

According to coated PC steel stranded cable 1a, the following effects can be exhibited:

(1) By providing optical fiber 4 in strand groove 32 of anti-corrosive coating 3, optical fiber 4 can be provided more readily than that in a case where optical fiber 4 is provided at the triple point of stranded cable 2.

(2) Since it is not necessary to untwist elemental wire 21, one end portion of optical fiber 4 can be more readily drawn from the one end side of coated PC steel stranded cable 1a in order to connect to a strain measurement device, than that in a case where optical fiber 4 is provided at the triple point of stranded cable 2.

(3) By fixing optical fiber 4 to strand groove 32 of anti-corrosive coating 3 using adhesive agent 51, optical fiber 4 is facilitated to follow expansion and contraction of stranded cable 2.

(4) By fixing optical fiber 4 to strand groove 32 of anti-corrosive coating 3 using adhesive agent 51, a conventional hollow body or filler material can be unnecessary, thus resulting in a reduced number of components.

(5) Outer coating 6 included therein serves to coat optical fiber 4. Hence, optical fiber 4 can be readily protected and optical fiber 4 can be prevented from being detached even if adhesive agent 51 is removed.

[Modification 1-1]

With reference to FIG. 3, a coated PC steel stranded cable 1*b* of a modification 1-1 will be described. Coated PC steel stranded cable 1*b* is different from coated PC steel stranded cable 1*a* of the first embodiment in that optical fiber 4 is fixed to the surface of anti-corrosive coating 3 by anti-corrosive coating 3 itself without using an adhesive agent 51 (FIG. 2) such as the one in the first embodiment, and is the same as coated PC steel stranded cable 1*a* of the first embodiment in the other points. That is, coated PC steel stranded cable 1*b* includes stranded cable 2, anti-corrosive coating 3, optical fiber 4, and outer coating 6. The following mainly describes this difference and the same configuration will not be described.

Optical fiber 4 has a portion embedded in the surface of outer circumferential portion 31 of anti-corrosive coating 3 and incorporated with anti-corrosive coating 3. Since they are incorporated with each other in this way, optical fiber 4 is facilitated to follow expansion and contraction of stranded cable 2, whereby the strain of elemental wire 21 is readily measured with precision. A remaining portion of optical fiber 4 is exposed from the surface of outer circumferential portion 31 and is coated with outer coating 6. In the surface of outer circumferential portion 31 of anti-corrosive coating 3, a recess 34 is formed which is formed by embedding optical fiber 4. This recess 34 is helically formed along the helix of optical fiber 4.

Coated PC steel stranded cable 1*b* is manufactured by disposing optical fiber 4 during formation of anti-corrosive coating 3 described in the first embodiment. Specifically, outer circumferential elemental wire 21*o* untwisted once is re-twisted around central elemental wire 21*c*, optical fiber 4 is then pressed against the surface of the resin, and then the resin is cooled. Accordingly, a portion of optical fiber 4 is embedded in the surface of outer circumferential portion 31 of anti-corrosive coating 3, thereby incorporating it with anti-corrosive coating 3.

[Modification 1-2]

With reference to FIG. 4 and FIG. 5, a coated PC steel stranded cable 1*c* of a modification 1-2 will be described. Coated PC steel stranded cable 1*c* is different from coated PC steel stranded cable 1*b* of modification 1-1 in terms of a configuration in which optical fiber 4 is fixed to the surface of anti-corrosive coating 3 by anti-corrosive coating 3 itself. Namely, coated PC steel stranded cable 1*c* is the same as that of modification 1-1 in terms of no use of adhesive agent and the other configuration. Coated PC steel stranded cable 1*c* includes stranded cable 2, anti-corrosive coating 3, optical fiber 4, and outer coating 6. Hereinafter, the following mainly describes this difference, and similar configurations will not be described.

In anti-corrosive coating 3, a press-fit groove 35 into which optical fiber 4 is press-fitted is formed in the surface of outer circumferential portion 31. By press-fitting optical fiber 4 in press-fit groove 35, optical fiber 4 can be fixed to anti-corrosive coating 3, whereby optical fiber 4 is facilitated to follow expansion and contraction of stranded cable 2.

Press-fit groove 35 may be formed across the total length of strand groove 32 in the longitudinal direction of strand groove 32, or may be partially formed in the longitudinal direction of strand groove 32. Here, as shown in FIG. 5, press-fit groove 35 is formed across the total length in the longitudinal direction of strand groove 32. It should be noted that in FIG. 5, for ease of description, outer coating 6 shown in FIG. 4 is omitted and optical fiber 4 is illustrated to be separated from anti-corrosive coating 3 (press-fit groove 35).

Press-fit groove 35 has a width substantially the same as or slightly smaller than the diameter of optical fiber 4. Accordingly, optical fiber 4 can be facilitated to be press-fitted therein without damaging optical fiber 4. After disposing it in press-fit groove 35, optical fiber 4 is unlikely to be detached from press-fit groove 35. The depth of press-fit groove 35 can be appropriately selected as long as optical fiber 4 is not detached. For example, the depth of press-fit groove 35 can be as large as the diameter of optical fiber 4. Press-fit groove 35 can be formed by cutting after forming anti-corrosive coating 3.

[Modification 1-3]

With reference to FIG. 6 and FIG. 7, a coated PC steel stranded cable 1*d* of a modification 1-3 will be described. Coated PC steel stranded cable 1*d* is different from the first embodiment and modifications 1-1 and 1-2 in that optical fiber 4 follows expansion and contraction of stranded cable 2 by frictional resistance between optical fiber 4 and anti-corrosive coating 3 without fixing optical fiber 4 to anti-corrosive coating 3. The other configurations are the same as those of the first embodiment and modifications 1-1 and 1-2. The following mainly describes this difference, and similar configurations will not be described. It should be noted that in FIG. 7, for ease of description, outer coating 6 shown in FIG. 6 is omitted and optical fiber 4 is shown to be separated from anti-corrosive coating 3 (strand groove 32).

Coated PC steel stranded cable 1*d* includes: the same stranded cable 2, anti-corrosive coating 3, and optical fiber 4 as those in the first embodiment; solid particles 71 for forming irregularity 7 for increasing frictional resistance with optical fiber 4; and outer coating 6. Here, solid particles 71 are constituted of a member different from that of anti-corrosive coating 3, and has a portion partially exposed from the surface of outer circumferential portion 31 of anti-corrosive coating 3, and has a remainder embedded in outer circumferential portion 31. With these solid particles 71, the frictional resistance between optical fiber 4 and anti-corrosive coating 3 and the frictional resistance between anti-corrosive coating 3 and outer coating 6 can be increased, whereby optical fiber 4 is facilitated to follow expansion and contraction of stranded cable 2. For solid particles 71, known particles such as sand can be used.

Coated PC steel stranded cable 1*d* is manufactured by spraying solid particles 71 and then cooling the resin in the manufacturing process of coated PC steel stranded cable 1*b* of modification 1-1 instead of pressing optical fiber 4 against the resin applied to stranded cable 2. Then, a portion of solid particles 71 is exposed from the epoxy resin surface and a remainder is embedded in the resin. Optical fiber 4 is embedded in the material of outer coating 6 by: disposing optical fiber 4 in contact with the embedded surface of solid particles 71; and extruding the molten resin for outer coating 6 at the outer circumferential portion. Then, the resin for outer coating 6 is cooled and is accordingly contracted to bring outer coating 6 into contact with the surface in which solid particles 71 are embedded. The material of outer coating 6 is preferably a PE resin as described above.

[Modification 1-4]

With reference to FIG. 8 and FIG. 9, a coated PC steel stranded cable 1e of modification 1-4 will be described. Coated PC steel stranded cable 1e is different from modification 1-3 in that irregularity 7 for causing optical fiber 4 to follow expansion and contraction of stranded cable 2 by way of frictional resistance is formed at anti-corrosive coating 3 itself, and is the same as that of modification 1-3 in the other point. Namely, coated PC steel stranded cable 1e includes stranded cable 2, anti-corrosive coating 3, optical fiber 4, and outer coating 6. The following mainly describes this difference, and similar configurations will not be described.

Irregularity 7 is formed continuously at the surface of anti-corrosive coating 3 using a material for anti-corrosive coating 3. In this irregularity 7, recesses and projections are formed alternately in the form of stripes. The longitudinal direction of each of the recesses and projections of irregularity 7 can be formed along the following direction (1) or (2): (1) a helical direction of stranded cable 2; and (2) a helical direction opposite to the foregoing helical direction of stranded cable 2. In each of the directions (1) and (2), optical fiber 4 crosses irregularity 7 to facilitate increase in friction between optical fiber 4 and irregularity 7 and friction between irregularity 7 and outer coating 6. Hence, optical fiber 4 is facilitated to follow expansion and contraction of stranded cable 2. Here, as shown in FIG. 9, the longitudinal direction of each of the recesses and projections of irregularity 7 is along the helical direction opposite to the helical direction of stranded cable 2. It should be noted that for ease of description, in FIG. 9, outer coating 6 shown in FIG. 8 is omitted and optical fiber 4 is illustrated to be separated from anti-corrosive coating 3. In addition to this, thick portions and thin portions of anti-corrosive coating 3 can be formed in the axial direction at a predetermined interval. Namely, anti-corrosive coating 3 can be in a stripe-like shape in which annular projections having a uniform height and annular recesses each having a diameter smaller than that of each of annular projections on the surface of anti-corrosive coating 3 are alternately formed in the longitudinal direction.

Coated PC steel stranded cable 1e can be formed by causing coated PC steel stranded cable 1a of the first embodiment to pass through a roller having an inner circumferential surface provided with irregularity after re-twisting outer circumferential elemental wire 21o and before cooling the applied resin in the process of manufacturing coated PC steel stranded cable 1a of the first embodiment.

Second Embodiment

With reference to FIG. 10, a coated PC steel stranded cable 1f of a second embodiment will be described. Coated PC steel stranded cable 1f is mainly different from coated PC steel stranded cable 1a of the first embodiment in that coated PC steel stranded cable 1f is of the inner positioning type in which optical fiber 4 is provided in an inner strand groove 22 of anti-corrosive coating 3. The following mainly describes this difference, and similar configurations and effects will not be described.

Coated PC steel stranded cable 1f includes stranded cable 2, anti-corrosive coating 3, optical fiber 4, and outer coating 6. The material of anti-corrosive coating 3 is used as a PE resin. Optical fiber 4 is configured such that the material of each of the core and the clad is quartz glass and an optical fiber elemental wire including a primary coating is employed. Optical fiber 4 is disposed at a position corresponding to strand groove 22 formed at the triple point surrounded by three adjacent elemental wires 21 of stranded cable 2 (central elemental wire 21c and two outer circumferential elemental wires 21o). Optical fiber 4 is fixed to and is incorporated with stranded cable 2 at filler portion 33 of anti-corrosive coating 3 in this strand groove 22. The description above has discussed the triple point when the stranded cable has seven elemental wires; however, when the stranded cable has 19 elemental wires, a space between the various elemental wires, such as a space surrounded by outer and inner circumferential elemental wires, may be employed. Although the triple point depends on the wire sizes of the outer and inner circumferential elemental wires, there may be employed a space surrounded by two outer circumferential elemental wires and one inner circumferential elemental wire.

Coated PC steel stranded cable 1f is manufactured by: preparing a composite wire in which optical fiber 3 is disposed at strand groove 22 formed at the triple point of stranded cable 2; and forming anti-corrosive coating 3 by coating the outer circumference of the composite wire with a PE resin and filling the PE resin between elemental wires 21. The composite wire can be produced by one of the following methods (1) to (4).

(1) Forcing Optical Fiber 4

The outer circumference of stranded cable 2 is surrounded by a cylindrical member (not shown) such as a contraction tube in order to avoid fluid from escaping to outside of stranded cable 2 and form a flow path in the axial direction of stranded cable 2. Then, optical fiber 4 is forced using compressed air into strand groove 22 formed at the triple point of stranded cable 2.

(2) Twisting Optical Fiber 4

When twisting six outer circumferential elemental wires 21o together helically around central elemental wire 21c, optical fiber 4 is twisted together with outer circumferential elemental wire 21o such that optical fiber 4 is disposed at the triple point of stranded cable 2.

(3) Drawing Optical Fiber 4

When twisting six outer circumferential elemental wires 21o together helically around central elemental wire 21c, a wire thinner than optical fiber 4 is twisted together with outer circumferential elemental wire 21o such that the thinner wire is disposed at the triple point of stranded cable 2. Then, optical fiber 4 is connected to the tip of the wire at the one end side of stranded cable 2. Then, by drawing the wire from the other end side of stranded cable 2, optical fiber 4 is drawn into the triple point.

(4) Untwisting Outer Circumferential Elemental Wire 21o and Positioning Optical Fiber 4

Stranded cable 2 is produced by twisting six outer circumferential elemental wires 21o together helically around central elemental wire 21c. One outer circumferential elemental wire 21o of this stranded cable 2 is untwisted. Accordingly, between outer circumferential elemental wires 21o, a space corresponding to one outer circumferential elemental wire 21o is formed helically. Next, optical fiber 4 is disposed in the space. Then, untwisted outer elemental wire 21o is disposed to fill the space.

In accordance with one of the above methods (1) to (4), the composite wire is produced, thereby extruding the molten PE resin to the outer circumference of stranded cable 2. On this occasion, stranded cable 2 does not need to be untwisted once. Then, pressure is applied from the outer circumference side of stranded cable 2 by the PE resin extruded to the outer circumference of stranded cable 2, thereby providing the PE resin between outer circumferential elemental wire 21o and central elemental wires 21c. By cooling the PE resin in this state, anti-corrosive coating 3 can be formed in which filler portion 33 and outer circumferential portion 31 are formed continuously. In filler portion 33, the PE resin is provided without forming a space at the triple point among central elemental wire 21c and two outer circumferential elemental wires 21o. Outer circumferential portion 31 is along the helical outline of outer circumferential elemental wire 21o at the outer circumference of outer circumferential elemental wire 21o.

[Function and Effect]

According to coated PC steel stranded cable 1f of the second embodiment, the following effects can be exhibited:

(1) Since optical fiber 4 is surrounded by the three elemental wires by disposing optical fiber 4 at the triple point of stranded cable 2, protection of optical fiber 4 can be more facilitated.

(2) Since optical fiber 4 is fixed to and is incorporated with elemental wire 21 by filler portion 33 of anti-corrosive coating 3 at the triple point, optical fiber 4 is facilitated to follow expansion and contraction of stranded cable 2.

(3) Since the space at the triple point can be used effectively, the diameter of coated PC steel stranded cable 1f can be unlikely to be large.

(4) Since no adhesive agent is necessary, the number of components can be reduced further.

[Modification 2-1]

With reference to FIG. 11, the following describes a coated PC steel stranded cable 1g of a modification 2-1. Coated PC steel stranded cable 1g is different from coated PC steel stranded cable 1f of the second embodiment in that the diameter of central elemental wire 21c is different from the diameter of outer circumferential elemental wire 21o, and is the same as coated PC steel stranded cable 1f of the second embodiment in the other points. Namely, coated PC steel stranded cable 1g includes stranded cable 2, anti-corrosive coating 3, and optical fiber 4, and optical fiber 4 is disposed at strand groove 22 formed at the triple point of stranded cable 2. The following mainly describes this difference, and similar configurations will not be described.

The diameter of outer circumferential elemental wire 21o and the diameter of central elemental wire 21c may be selected appropriately to be different from each other while satisfying the following conditions (1) and (2):

(1) A total cross-sectional area of all the elemental wires of outer circumferential elemental wire 21o and central elemental wire 21c is comparable to that in the case where the diameter of outer circumferential elemental wire 21o is substantially the same as the diameter of central elemental wire 21c as in the second embodiment.

(2) The length of the space between adjacent outer circumferential elemental wires 21o is not less than the diameter of optical fiber 4. This length of the space refers to, when a space is formed by widening an interval at one position between outer circumferential elemental wires 21o and the other intervals therebetween are closed, a length between straight lines circumscribed to each of these outer circumferential elemental wires 21o among straight lines orthogonal to the common circumscribed line of two outer circumferential elemental wires 21o that form the space. Namely, the interval at one position becomes larger than the diameter of optical fiber 4 among adjacent outer circumferential elemental wires 21o when outer circumferential elemental wires 21o are twisted around central elemental wire 21c.

By satisfying these conditions (1) and (2), when a space is secured using an appropriate tool readily insertable between outer circumferential elemental wires 21o (such as a roller-cutter or the like), optical fiber 4 can be disposed readily at the triple point and the outer diameter of stranded cable 2 (diameter of envelope circle) is unlikely to become large. Here, as compared with the case where the diameter of outer circumferential elemental wire 21o is substantially the same as the diameter of central elemental wire 21c, central elemental wire 21c is slightly made larger and outer circumferential elemental wire 21o is slightly made smaller.

Optical fiber 4 may be an optical fiber elemental wire or an optical fiber core wire. Here, optical fiber 4 is configured as the optical fiber core wire.

Coated PC steel stranded cable 1g can be manufactured as follows. First, stranded cable 2 and optical fiber 4 are prepared. Next, an interval at one position between adjacent outer circumferential elemental wires 21o in stranded cable 2 is widened and the other intervals therebetween are closed. Then, optical fiber 4 is disposed to extend from the widened interval along strand groove 22 at the triple point of stranded cable 2. Next, an interval is widened between outer circumferential elemental wires 21o at a position facing the position having the widened interval with central elemental wire 21c interposed therebetween, and optical fiber 4 is disposed in a similar manner. In this way, the composite wire is produced. Next, a molten PE resin is extruded onto the outer circumference of the composite wire and this PE resin is cooled. Since the diameter of outer circumferential elemental wire 21o is smaller than that of central elemental wire 21c, a space is formed between adjacent outer circumferential elemental wires 21o. Therefore, since the composite wire can be produced by disposing optical fiber 4 at the triple point without using the method for manufacturing the composite wire described in the second embodiment, optical fiber 4 can be readily disposed. Moreover, for formation of anti-corrosive coating 3, the PE resin can be readily and sufficiently supplied to between outer circumferential elemental wire 21o and central elemental wires 21c without untwisting stranded cable 2 or applying pressure from the outer circumference to the molten PE resin.

[Modification 2-2]

With reference to FIG. 12, the following describes a coated PC steel stranded cable 1h of a modification 2-2. Coated PC steel stranded cable 1h is different from coated PC steel stranded cable 1f of the second embodiment in terms of the position of optical fiber 4, and is the same as the second embodiment in terms of the other points. That is, coated PC steel stranded cable 1h includes stranded cable 2, anti-corrosive coating 3, and optical fiber 4. The following mainly describes this difference, and similar configurations will not be described.

Optical fiber 4 may be an optical fiber elemental wire or an optical fiber core wire. Here, optical fiber 4 is the optical fiber core wire. Optical fiber 4 is disposed at strand groove 22 formed between adjacent outer circumferential elemental wires 21o. Since optical fiber 4 is disposed at strand groove 22 between adjacent outer circumferential elemental wires 21o, optical fiber 4 can be disposed more readily as compared with a case where optical fiber 4 is disposed in strand groove 22 formed at the triple point of stranded cable 2.

Coated PC steel stranded cable 1h can be formed by: preparing stranded cable 2 and optical fiber 4; disposing optical fiber 4 in strand groove 22 between adjacent outer circumferential elemental wires 21o; and then forming anti-corrosive coating 3 in the same manner as in the second embodiment.

It should be noted that the scope of the present invention is not limited to the examples described above, is defined by the terms of the claims, and is intended to include any modifications within the scope and meaning equivalent to the terms of the claims. For example, with reference to FIGS. 4 and 5, it has been illustrated in modification 1-2 described above that anti-corrosive coating 3 is provided with press-fit groove 35; however, instead of press-fit groove 35, a storage groove wider than press-fit groove 35 may be provided to store optical fiber 4 therein without permitting optical fiber 4 to be press-fitted therein. In this case, optical fiber 4 may be fixed using an adhesive agent in the storage groove or optical fiber 4 may be disposed in the storage groove, which is then sealed with outer coating 6. In this way, optical fiber 4 can be prevented from being detached from the storage groove and optical fiber 4 can be facilitated to follow expansion and contraction of stranded cable 2.

INDUSTRIAL APPLICABILITY

The coated PC steel stranded cable according to one embodiment of the present invention can be used suitably to reinforce a concrete structure when embedded inside the concrete structure or disposed outside the concrete structure. Moreover, the coated PC steel stranded cable according to one embodiment of the present invention can be used suitably to check a tension state across the total length of the stranded cable by using the optical fiber as a sensor.

REFERENCE SIGNS LIST 1a, 1b, 1c, 1d, 1e, 1f, 1g, 1h: coated PC steel stranded cable; 2: stranded cable; 21: elemental wire; 21c: central elemental wire; 21o: outer circumferential elemental wire; 22: strand groove; 3: anti-corrosive coating; 31: outer circumferential portion; 32: strand groove; 33: filler portion; 34: recess; 35: press-fit groove; 4: optical fiber; 5: fixation member; 51: adhesive agent; 6: outer coating; 7: irregularity; 71: solid particle.

The invention claimed is:

1. A coated prestressed concrete (PC) steel stranded cable comprising:
a stranded cable in which a plurality of elemental wires each composed of steel are twisted together;
an anti-corrosive coating that coats an outer circumference of the stranded cable; and
an optical fiber provided at a position corresponding to a strand groove in the stranded cable,
the stranded cable having a plurality of outer circumferential elemental wires constituting the outer circumference of the stranded cable, and an inner circumferential elemental wire or central elemental wire adjacent to the plurality of outer circumferential elemental wires, wherein the inner circumferential elemental wire or central elemental wire is located at a center in a radial direction of the coated PC steel stranded cable,
each one of the plurality of outer circumferential elemental wires having a diameter smaller than a diameter of the inner circumferential elemental wire or the central elemental wire,
the anti-corrosive coating having a filler portion provided at a triple point surrounded by the plurality of outer circumferential elemental wires and the inner circumferential elemental wire or the central elemental wire,
the optical fiber being disposed at the strand groove formed between adjacent outer circumferential elemental wires of the stranded cable, the optical fiber being entirely embedded in the anti-corrosive coating without using an adhesive agent,
the plurality of outer circumferential elemental wires comprising a first set of outer circumferential elemental wires, a space being formed between at least two adjacent outer circumferential elemental wires of the first set, the space being filled with the filler portion,
the plurality of outer circumferential elemental wires comprising a second set, at least two adjacent outer circumferential elemental wires of the second set contact one another, and
each of the outer circumferential elemental wire, the inner circumferential elemental wire, and the central elemental wire consists of a single strand.

2. The coated PC steel stranded cable according to claim 1, wherein at least one adjacent outer circumferential elemental wire is in both the first set and the second set.

3. The coated PC steel stranded cable according to claim 1, wherein the first set and the second set include different outer circumferential elemental wires.

4. The coated PC steel stranded cable according to claim 1, wherein the adjacent outer circumferential elemental wires in the first set are mutually exclusive of the adjacent outer circumferential elemental wires in the second set.

5. A coated prestressed concrete (PC) steel stranded cable comprising:
a stranded cable in which a plurality of elemental wires each composed of steel are twisted together;
an anti-corrosive coating that coats an outer circumference of the stranded cable; and
an optical fiber provided at a position corresponding to a strand groove in the stranded cable,
the optical fiber being disposed at a triple point surrounded by a plurality of outer circumferential elemental wires and an inner circumferential elemental wire or central elemental wire, the plurality of outer circumferential elemental wires and the inner circumferential elemental wire or the central elemental wire constituting the stranded cable, the inner circumferential elemental wire or the central elemental wire being adjacent to the plurality of outer circumferential elemental wires, wherein the inner circumferential elemental wire or central elemental wire is located at a center in a radial direction of the coated PC steel stranded cable,
each one of the plurality of outer circumferential elemental wires having a diameter smaller than a diameter of the inner circumferential elemental wire or the central elemental wire,
the anti-corrosive coating having a filler portion provided between the elemental wires,
the plurality of outer circumferential elemental wires comprising a first set of outer circumferential elemental wires, a space being formed between at least two adjacent outer circumferential elemental wires of the first set, the space being filled with the filler portion,
the plurality of outer circumferential elemental wires comprising a second set, at least two adjacent outer circumferential elemental wires of the second set contact one another, and
each of the outer circumferential elemental wire, the inner circumferential elemental wire, and the central elemental wire consists of a single strand.

6. The coated PC steel stranded cable according to claim 5, wherein the stranded cable includes the central elemental wire, and the plurality of outer circumferential elemental wires helically twisted around an outer circumference of the central elemental wire, and the space between adjacent outer circumferential elemental wires has a length equal to or more than a diameter of the optical fiber.

7. The coated PC steel stranded cable according to claim 5, further comprising: an outer coating that coats the outer circumference of the anti-corrosive coating.

8. A coated prestressed concrete (PC) steel stranded cable comprising:

a stranded cable in which a plurality of elemental wires each composed of steel are twisted together;

an anti-corrosive coating that coats an outer circumference of the stranded cable;

an outer coating that coats an outer circumference of the anti-corrosive coating; and an optical fiber provided at a position inwardly of an outer circumferential surface of the outer coating and corresponding to a strand groove in the stranded cable, the anti-corrosive coating having a surface provided with a press-fit groove in which a portion of the optical fiber is press-fitted, the optical fiber being fixed by the anti-corrosive coating without using an adhesive agent, the stranded cable having a plurality of outer circumferential elemental wires constituting the outer circumference of the stranded cable, and an inner circumferential elemental wire or central elemental wire adjacent to the plurality of outer circumferential elemental wires, wherein the inner circumferential elemental wire or central elemental wire is located at a center in a radial direction of the coated PC steel stranded cable, and each of the outer circumferential elemental wire, the inner circumferential elemental wire, and the central elemental wire is single wire.

9. A coated prestressed concrete (PC) steel stranded cable comprising:

a stranded cable in which a plurality of elemental wires each composed of steel are twisted together;

an anti-corrosive coating that coats an outer circumference of the stranded cable;

an outer coating that coats an outer circumference of the anti-corrosive coating; and an optical fiber provided at a position inwardly of an outer circumferential surface of the outer coating and corresponding to a strand groove in the stranded cable, the anti-corrosive coating having a surface provided with an irregularity for increasing frictional resistance with the optical fiber and the outer coating, and the irregularity being smaller than an irregularity formed by the strand groove, the stranded cable having a plurality of outer circumferential elemental wires constituting the outer circumference of the stranded cable, and an inner circumferential elemental wire or central elemental wire adjacent to the plurality of outer circumferential elemental wires, wherein the inner circumferential elemental wire or central elemental wire is located at a center in a radial direction of the coated PC steel stranded cable, each one of the plurality of outer circumferential elemental wires having a diameter smaller than a diameter of the inner circumferential elemental wire or the central elemental wire, the plurality of outer circumferential elemental wires comprising a first set of outer circumferential elemental wires, a space being formed between at least two adjacent outer circumferential elemental wires of the first set, the space being filled with the filler portion, the plurality of outer circumferential elemental wires comprising a second set, at least two adjacent outer circumferential elemental wires of the second set contact one another, and each of the outer circumferential elemental wire, the inner circumferential elemental wire, and the central elemental wire consists of a single strand.

10. A coated prestressed concrete (PC) steel stranded cable comprising:

a stranded cable in which a plurality of elemental wires each composed of steel are twisted together;

the stranded cable having a plurality of outer circumferential elemental wires constituting the outer circumference of the stranded cable, and an inner circumferential elemental wire or central elemental wire adjacent to the plurality of outer circumferential elemental wires, wherein the inner circumferential elemental wire or central elemental wire is located at a center in a radial direction of the coated PC steel stranded cable;

an anti-corrosive coating having an outer circumferential portion that coats an outer circumference of the stranded cable;

an outer coating that coats an outer circumference of the anti-corrosive coating; and an optical fiber provided at a position inwardly of an outer circumferential surface of the outer coating and corresponding to a strand groove in the stranded cable so as to follow expansion and contraction of the stranded cable, each one of the plurality of outer circumferential elemental wires having a diameter smaller than a diameter of the inner circumferential elemental wire or the central elemental wire, the plurality of outer circumferential elemental wires comprising a first set of outer circumferential elemental wires, a space being formed between at least two adjacent outer circumferential elemental wires of the first set, the space being filled with the filler portion, the plurality of outer circumferential elemental wires comprising a second set, at least two adjacent outer circumferential elemental wires of the second set contact one another, and each of the outer circumferential elemental wire, the inner circumferential elemental wire, and the central elemental wire consists of a single strand.

11. The coated PC steel stranded cable according to claim 10, wherein the optical fiber is fixed by an adhesive agent to the strand groove on a surface of the anti-corrosive coating.

12. The coated PC steel stranded cable according to claim 10, wherein the optical fiber is fixed by the anti-corrosive coating without using an adhesive agent.

13. The coated PC steel stranded cable according to claim 12, wherein the optical fiber has a portion embedded in and incorporated with the anti-corrosive coating.

* * * * *